United States Patent
Dill

[15] 3,661,358
[45] May 9, 1972

[54] CABLE PULLING METHOD
[72] Inventor: Marcus J. Dill, Dallas, Tex.
[73] Assignee: The Western Company of North America, Fort Worth, Tex.
[22] Filed: Oct. 13, 1969
[21] Appl. No.: 865,648

[52] U.S. Cl. ................................ 254/134.3 R, 260/29.6 H
[51] Int. Cl. ............................................................ E21c 29/16
[58] Field of Search ............ 254/134.3, 134.3 FT; 260/89.7, 260/29.6

[56] References Cited

UNITED STATES PATENTS 3,363,879  1/1968  Irik .............................. 254/134.3 FT Primary Examiner—Othell M. Simpson
Attorney—Richards, Harris & Hubbard

[57] ABSTRACT

Elongated objects such as cables, wire, and the like, are passed through relatively tight-fitting tubular members by initially applying an aqueous mixture of a particulate hydratable polymer having a molecular weight of at least about 200,000 to each elongated object and thereafter passing the object through the tubular member by means of a pulling line. For example, an aqueous slurry containing from about 0.5 to about 4 weight percent of an admixture of a copolymer of acrylamide and vinylpyridine, and sodium carboxymethylcellulose is applied to the surface a telephone cable as it is being pulled through an underground conduit. The slurry will adhere tenaciously to the conduit, to reduce the frictional forces which normally inhibit the pulling operation, and is non-deleterious to conventional cable jacket material.

9 Claims, 3 Drawing Figures

PATENTED MAY 9 1972 3,661,358

INVENTOR
MARCUS J. DILL

Richards, Harris & Hubbard
ATTORNEY

CABLE PULLING METHOD

This invention relates to friction reduction. In another aspect, this invention relates to a novel method of threading elongated objects, such as cables and wires through tubular members.

In conventional cable pulling operations, such as operations wherein a heavy telephone cable is threaded through either underground or overhead tubular conduits, problems have been encountered which result from both the static and kinetic frictional forces which exist between the periphery of the cable and the tubular conduit. Generally, a pulling line is initially threaded through the conduit and attached to the leading end of the cable. The pulling line is then withdrawn from the conduit by a suitable means such as a motor winch thereby pulling the cable therethrough.

In many instances, especially wherein the cable is to be pulled through rather long underground conduits, the frictional forces become so great that the cable becomes lodged within the conduit and cannot be removed by pulling in either direction. In these instances, the underground conduit must be opened adjacent the leading end of the cable and the cable spliced to a second cable which is pulled through the remaining unfilled portion of the conduit. This operation is quite costly and burdensome.

In an attempt to reduce the friction between the tubular conduit and the elongated member passing therethrough, various materials have been used as lubricants. For example, aqueous slurrys of bentonite clay, greases, soaps, and the like, have been applied to the surface of the cable and/or tubular conduit in an attempt to reduce frictional forces therebetween. The use of the bentonite clay and water mixture as a cable lubricant has not been too successful because the mixture (1) will not adhere to the cable during the pulling procedure, (2) is easily diluted with water in underground cable pulling operations, and (3) does not significally reduce friction. The soap and grease lubricants have been unsuccessful in many operations because they deleteriously attack the cable jackets made of such material as polyethylene, rubber, metal, and the like. In addition, these conventional lubricants are generally ineffective in overcoming static friction in the longer underground conduits once the cable has come to rest, for example, conduits over about 600 feet in length for containing about a 1 inch diameter electric cable.

Therefore, one object of this invention is to provide a novel method of reducing friction between an elongated object and a tubular receiving member through which the elongated object is passed.

Another object of this invention is to provide a novel method for installing electrical cables within a long tubular conduit, which will not harm the cable jacket material.

A further object of this invention is to provide a method of pulling great lengths of heavy cable, such as telephone cable through correspondingly long tubular conduits.

According to the invention, elongated members, such as cables, wires, and the like, are passed through tubular receiving members by initially applying an aqueous slurry of particulate hydratable polymeric material between engaging surfaces of the elongated member and the tubular receiving member. An aqueous slurry of particulate hydratable polymer reduces both the static and dynamic frictional forces between the elongated member and tubular member to a degree not heretofore known in the art. In addition, the slurry is non-deleterious to conventional cable jackets and insulations made of synthetic polymeric material or metal. The hydratable polymeric material generally has a molecular weight of at least about 200,000, and the aqueous slurry contains from about 0.01 to about 25 weight percent, preferably from about 0.5 to 4 weight percent of hydratable polymer.

This invention can be more easily understood from a study of the drawing which:

Figure 1:
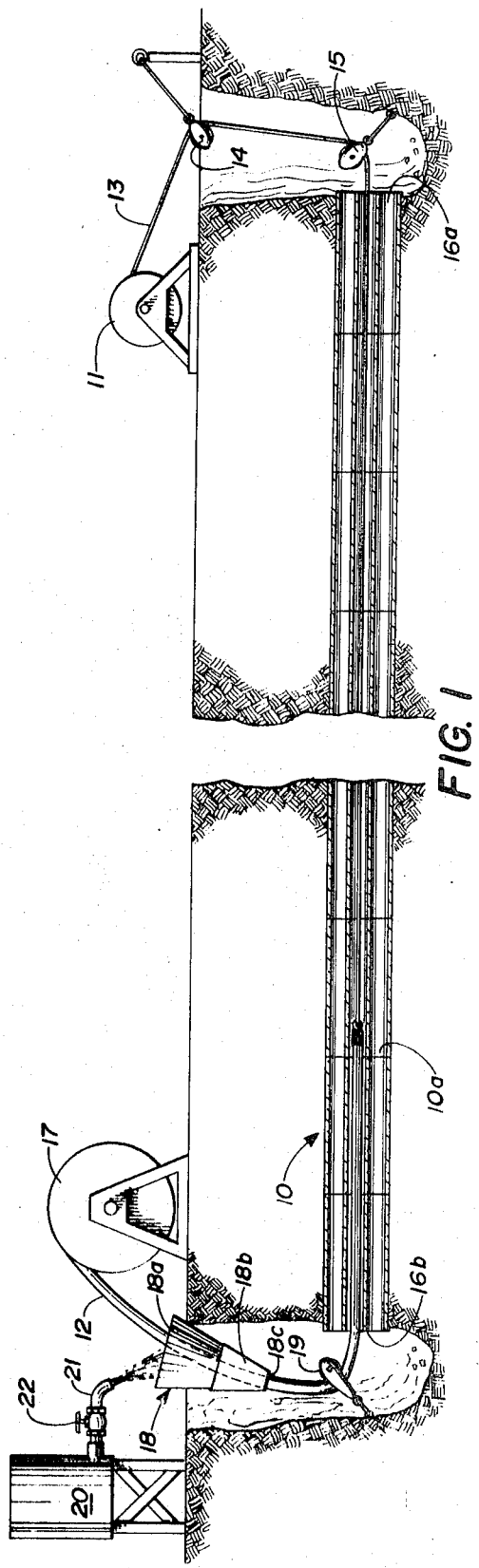
FIG. 1 is a schematic illustration of a suitable apparatus for performing the process of the subject invention.

Referring to FIG. 1, conduit unit 10 is a conventional multi-channel tile conduit member utilized by municipalities as underground cable receiving members. Conventionally, conduit unit 10 comprises a series of tile sections operatively attached, and each section contains nine conduits 10a therethrough. Motor winch 11 is positioned adjacent the delivery end 16a of conduit 10a to which it is desired to communicate with cable 12. Cable 12 can be any suitable utility cable, such as a telephone cable containing a series of channels therein.

Line 13, which is a high strength steel cable, or the like, is unreeled from motor winch 11 and passed through fixed pulleys 14 and 15 and into conduit 10a. Line 13 is pushed into conduit 10a throughout the length thereof until it reaches the receiving end 16b of conduit 10a. Reel 17 is operatively positioned adjacent the receiving end 16b of conduit 10a and has cable 12 wound thereon. Cable 12 is passed through funnel 18 and fixed pulley 19, and its leading end is operatively connected to the end of the line 13 by suitable means, such as clamps, or the like.

Slurry tank 20 in this embodiment generally comprises a gravity flow tank having a delivery conduit 21 with valve 22 operatively positioned therein. Funnel means 18 generally comprises an upper metal funnel body 18a with a lower flexible sleeve extension 18b which can be made of a suitable flexible material, such as leather. The lower opening 18c of sleeve extension 18b is only slightly wider in diameter than cable 12. In operation, conduit 21 will deliver a polymer slurry into the upper metal portion 18a of funnel 18. The slurry will run to the lower flexible sleeve extension 18b and uniformly contact the periphery of cable 12. In this manner, the slurry will substantially and uniformly coat the periphery of cable 12 as it is passed through funnel 18 and into conduit 10a.

The polymer slurries which are used within the scope of this invention generally comprise aqueous slurries of particulate hydratable polymers having molecular weights (weight average) of at least about 200,000, e.g., at least that of Guar Gum. Generally, the aqueous slurry will consist of from about 0.01 to 25 weight percent of the hydratable polymeric material. Suitable hydratable polymer materials which can be used in the scope of this invention include poly(acrylamide), Guar Gum, Sodium carboxymethylcellulose, poly(ethyleneoxide), poly(vinylpyrrolidone), cellulose ether, sodium poly(styrenesulfonate), sodium poly(acrylate), a copolymer of acrylamide and vinylpyridine, a copolymer of acrylamide and sodium acrylate, and combinations thereof. These polymers in a particular powdered form are admixed with the desired amount of water to form the corresponding slurry which is deposited within tank 20. The particle size of the hydratable polymer generally ranges from about 10 to less than about 40 mesh (U.S. standard).

Suitable examples of commercially available hydratable polymers include a particulate copolymer of acrylamide and sodium acrylate in which the acrylamide-sodium acrylate monomer units are in a ratio of 3 to 1. This copolymer is marketed under a trademark of "Sepran" AP-30 by Dow Chemical Company. The preferred material generally has a particle size such that 95 percent of the particles pass through a 20 mesh screen (U.S. standard). Another copolymer is an acrylamide-acrylate copolymer marketed under the trademark of "Reten" A-1 by Hercules Inc. The preferred particle size is such that 99 percent will pass through a 40 mesh screen (U.S. standard). another polyacrylamide-polyamine copolymer marketed by Hercules, Inc. is sold under the trademark of "Reten 210".

The most preferred particulate hydratable polymer material used in the scope of this invention generally comprises a cationic-anionic polymer mixture which complexes to form a very durable slippery membrane when wet. An example of such a mixture is a mixture of a copolymer of acrylamide and vinylpyridine (Reten 210) and sodium carboxymethylcellulose combined in a weight ratio of 2 to 1.

In addition to the water and polymer, the slurry can contain suitable gelling agents, dispersing agents, such as the lower aliphatic alcohols, e.g., methanol, or ethanol, and plasticizers such as glycerol.

It has been found that application of these hydratable polymer slurries to cables being pulled through tubular conduits has resulted in extremely superior results than heretofore known in the art. Generally, the reduction in both static and kinetic friction is as high as 50 percent. In addition, the coating of hydratable polymers on the cable will not deleteriously affect protective jackets for the cables made of metal or polymeric materials such as polyethylene, neoprene, or rubber.

Thus, the aqueous particulate hydratable polymer slurry is deposited within slurry tank 20, valve 22 actuated to allow the slurry to flow within funnel 18, and motor winch 11 is actuated to pull cable 12 through conduit 10a. The pulling action automatically causes a layer of the water-polymer mixture to coat the periphery of cable 12. This in effect, is a very tenaciously adhering, slippery membrane on the surface of cable 12 as it enters conduit 10a.

Figure 2:
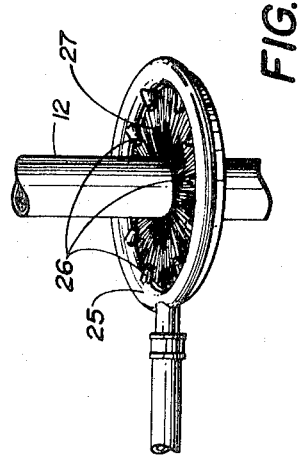
FIG. 2 is a schematic illustration of a spray nozzle which can be used in the practice of this invention.
Figure 3:
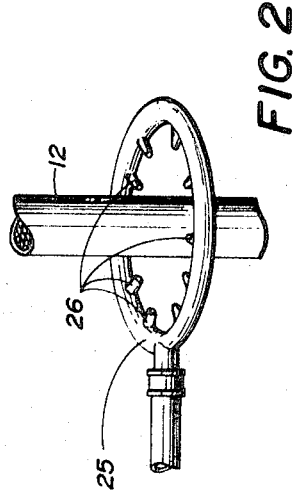
FIG. 3 is a schematic illustration of a modification of the nozzle of FIG. 2.

The polymer slurry can be applied to the cable by various means. For example, FIG. 2 illustrates an annular type nozzle arrangement for receiving cable 12. Nozzle unit 25 generally comprises an annular nozzle section carrying a series of inwardly directed nozzle apertures 26, and is attached to tank 20 through a suitable pumping means. The pump will create sufficient pressure to spray particulate hydratable polymer slurry from nozzle apertures 26 onto the periphery of cable 12 passing therethrough. FIG. 3 illustrates another embodiment of an applicator means having brush bristles 27 extending from the inner periphery of annular nozzle 25. In this arrangement, nozzle apertures 26 will deliver aqueous polymer slurry along the bristles 27 to saturate the same to assure that they will uniformly apply the layer of polymer slurry to the cable 12.

If desired, an alternate procedure can be utilized by applying a slurry of the particulate hydratable polymer in an alcohol suspending agent, initially to either the cable or tubular member, evaporating the suspending agent to form a polymeric film thereover and then later adding water to the film to form a slippery surface. Generally, an adequate slurry of suspending agent comprises less than about 50 weight percent particulate hydratable polymer and the rest suspending agent with or without a gelling agent and a plasticizer. A preferred slurry would include from about 50 to 60 weight percent of an alcohol such as methanol, ethanol or the like, from about 30 to about 90 percent of particulate hydratable polymeric material, and, if desired, a small amount of a gelling agent and a larger amount of a plasticizer. A suitable composition would include about 36 weight percent particulate hydratable polymer, 54 weight percent methanol and 10 weight percent glycerol. If desired, about 0.5 weight percent of a gelling agent can be added such as klucel HA, which is a cellulose ether gelling agent marketed by Hercules Inc. Thus, for example, the initial slurry can be passed through conduit 10a and the methanol allowed to evaporate therefrom to leave the polymer film. Alternatively, instead of injecting the polymer slurry into the conduit, a brush or rag could be impregnated with the slurry and passed through the pipeline to form the coating therein. Next, water can be passed through conduit 10a to yield a very slippery membrane adhering to the interior walls thereof.

The following examples are given to better facilitate the understanding of this invention, but are not intended to limit the scope thereof.

EXAMPLE 1

Equipment similar to that illustrated in FIG. 1 was utilized to pull a 3¼ inch diameter lead telephone cable through approximately 800 feet of 3.5 inch inside diameter tile conduit which was buried beneath the ground. In this example, an aqueous slurry consisting of 96 weight percent water and 4 weight percent of a polymer mixture consisting of two parts of a cationic polyacrylamide-polyamine (poly vinylpyridine) copolymer having a particle size such that 99 percent thereof passed through a 40 mesh screen (U.S. standard) and one part of sodium carboxymethylcellulose having a particle size such that 94 percent passed through a 40 mesh screen (U.S. standard) was applied to the surface of the cable as it was threaded through the conduit.

Approximately 15 gallons of the slurry was applied to the cable as it was pulled through the 800 foot conduit. After the cable had passed approximately 600 feet, the motor winch was stopped. The motor winch was thereafter re-started and the cable was pulled through the 800 feet of conduit. As a comparison, a lead cable as described above (3¼ inch diameter) was started through a similar tile conduit which was 800 feet long and 3.5 inches in inside diameter, except with no lubrication. The same equipment was used in pulling this cable as was used as described above, except, no lubrication was applied. After 600 feet, the motor winch was stopped. However, the cable could not be restarted and had to be abandoned in place.

The cable which was pulled according to the process of this invention moved much faster than the cable that contained no lubrication.

EXAMPLE 2

In this test, a 3/10 wire Neoprene jacketed cable, weighing 125 grams per foot and having a 0.68 inch diameter was pulled through a steel tube having a 1¼ inch outside diameter and 0.049 inch thick walls, in a series of runs. The steel tube was 16 feet long. A 1/16th inch diameter nylon cord was attached between the end of the cable and a force scale. The force scale was attached to a winch by a similar nylon cord.

First, the cable was pulled through the 16 foot long steel tube without any lubrication. The force scale was read at 3 foot increments to determine the tensile pull in grams. After that, a polymer slurry, the same as described in Example 1, was applied to the surface of the cable as it was being pulled through the steel tube. Again, the force scale was read at 3 foot intervals. The results of these tests were recorded in the Table below.

TABLE

| Length of Cable into tube (feet) | Pull(g.) Dry | Pull (grams) Lubricated |
| --- | --- | --- |
| 3 | 720 | 425 |
| 6 | 820 | 512 |
| 9 | 1030 | 560 |
| 12 | 1170 | 630 |

Thus, as can be seen from the data, force was reduced about 45 percent when pulling the lubricated cable according to this invention as opposed to pulling the dry cable.

In addition, polyethylene jacketed cable has been coated with various hydratable polymeric compositions according to this invention and subjected to temperatures of about 170° F. for about 170 hours. No degradation of the polyethylene jacket was noted.

While this invention has been described in relation to its preferred embodiments, it is to be understood that various modifications will now be apparent to those skilled in the art upon reading the specification and it is intended to cover the modifications which fall within the scope of the appended claims.

I claim:

1. In a method of pulling an elongated electrical cable through a length of conduit by attaching the leading end of said cable to a line which runs through said conduit and pulling said line and cable therethrough, the improvement comprising:

applying an aqueous slurry of a particulate hydratable polymer between engaging surfaces of said cable and conduit which consists essentially of an admixture of water and a particulate hydratable polymer having a weight average molecular weight of at least 200,000.

2. The method of claim 1 wherein aqueous slurry is applied to said cable as it passes into said conduit.

3. The method of claim 1 wherein said mixture contains from 0.01 to 25 weight percent of said particulate hydratable polymer.

4. The method of claim 3 wherein said particulate hydratable polymer is selected from the class of Guar Gum, poly(acrylamide), sodium carboxymethylcellulose, poly(ethyleneoxide), poly(vinylpyrrolidone), cellulose ether, sodium poly(styrenesulfonate), sodium poly(acrylate), a copolymer of acrylamide and vinylpyridine, a copolymer of acrylamide and sodium acrylate, and combinations thereof.

5. The method of claim 1 wherein said aqueous slurry is applied to the interior surface of said conduit prior to the time said cable is pulled therethrough.

6. The method of claim 5 wherein said aqueous slurry is applied to the interior surface of said conduit by the steps of:
  a. forming a first slurry of said particulate hydratable polymer and an alcohol suspending agent;
  b. coating said first slurry on the interior surface of said conduit and allowing said alcohol to evaporate therefrom and form a polymer film thereon; and
  c. passing water over said film to form a slipping membrane.

7. The method of claim 6 wherein said particulate hydratable polymer comprises less than about 50 weight percent of said first slurry.

8. The method of claim 7 wherein said particulate hydratable polymer is selected from the class of Guar Gum, poly(acrylamide), sodium carboxymethylcellulose, poly(ethyleneoxide), poly(vinylpyrrolidone), cellulose ether, sodium poly(styrenesulfonate), sodium poly(acrylate), a copolymer of acrylamide and vinylpyridine, a copolymer of acrylamide and sodium acrylate, and combinations thereof.

9. The method of claim 8 wherein said particulate hydratable polymer is a mixture of sodium carboxymethylcellulose and a copolymer of acrylamide and vinylpyridine.

* * * * *